United States Patent [19]

Purves

[11] Patent Number: 4,528,201

[45] Date of Patent: Jul. 9, 1985

[54] ALKALI-TREATED LECITHIN IN FATS

[75] Inventor: Edward R. Purves, Cincinnati, Ohio

[73] Assignee: The Procter & Gamble Co., Cincinnati, Ohio

[21] Appl. No.: 505,580

[22] Filed: Jun. 20, 1983

[51] Int. Cl.[3] .......................... A23D 5/00; A23D 5/02; A23J 7/02

[52] U.S. Cl. .................................. 426/262; 426/330.6; 426/601; 426/606; 426/607; 426/609; 426/662

[58] Field of Search ..................... 426/330.6, 262, 601, 426/606, 609, 662, 811

[56] References Cited

U.S. PATENT DOCUMENTS

| | | | |
|---|---|---|---|
| 1,982,186 | 11/1934 | Working | 426/611 |
| 2,125,849 | 8/1938 | Morris | 426/611 |
| 2,280,426 | 4/1942 | Thurman | 426/611 X |
| 2,444,984 | 7/1948 | Fitzpatrick | 426/662 X |
| 2,511,428 | 6/1950 | Buxton et al. | 426/662 X |
| 2,629,662 | 2/1953 | Julian et al. | 426/662 |
| 3,301,881 | 1/1967 | Davis | 426/662 X |
| 3,443,966 | 5/1969 | Reid . | |
| 3,896,975 | 7/1975 | Follmer . | |
| 4,096,258 | 6/1978 | Hanson . | |

FOREIGN PATENT DOCUMENTS

| | | |
|---|---|---|
| 107530 | 8/1979 | Japan . |
| 110210 | 8/1979 | Japan . |
| 124009 | 9/1979 | Japan . |
| 112825 | 9/1979 | Japan . |
| 126206 | 10/1979 | Japan . |
| 127408 | 10/1979 | Japan . |
| 127907 | 10/1979 | Japan . |
| 54400 | 4/1980 | Japan . |
| 2084606 | 4/1982 | United Kingdom . |
| 642316 | 1/1979 | U.S.S.R. . |

OTHER PUBLICATIONS

The Merck Index, Merck & Co. Inc., Rahway, N.J., Eighth Edition, 1968, pp. 956 and 853.

Bailey's Indus. Oil & Fat Products, D. Swern, ed., 3rd ed., Interscience Publishers, NY (1964), pp. 29-30, 41, 78, 291-293, 311, 381, 469, 731-735.

*Primary Examiner*—Robert Yoncoskie
*Attorney, Agent, or Firm*—Nancy S. Mayer; Rose Ann Dabek; Richard C. Witte

[57] ABSTRACT

Cooking fat compositions containing lecithin which resist excessive thermal darkening are disclosed. Methods for stabilizing lecithin to prevent excessive darkening in a heated cooking fat require treatment of the lecithin, or the cooking fat containing it, with a strongly basic compound. The lecithin can then be added to the fat at a higher level to improve the anti-sticking performance of the fat.

31 Claims, No Drawings

ALKALI-TREATED LECITHIN IN FATS

TECHNICAL FIELD

The present application relates to cooking fats, in particular to fat compositions containing lecithin which resist excessive thermal darkening upon heating. Processes for preventing excessive darkening of fats containing lecithin when exposed to heat require treatment of the lecithin or fat with a strongly basic compound.

BACKGROUND OF THE INVENTION

Lecithin is commonly added to cooking fats as an anti-sticking agent, but has the disadvantage that it darkens in color at high temperatures, thereby limiting the level which can be used. Foodservice establishments are often required to hold a heated fat for extended periods of time. Fats containing a higher than normal level of lecithin to enhance the anti-sticking properties darken more quickly when subjected to continuous heating. Associated with this discoloration is generation of an off-flavor. The increased darkening and generation of off-flavor render such fats unacceptable. An effective means of preventing the darkening of lecithin at high temperatures is desirable and would permit its use at increased levels in fats to improve their anti-sticking performance.

Fat or oil additives known for inhibiting darkening of phospholipids, such as lecithin, upon heating are primarily acidic or weakly basic compounds such as amino acid salts, carboxylic acids and derivatives, or salts of carbonates or bicarbonates. inhibition of discoloration of phospholipids in fatty oils during heating can be achieved by the addition to the oil of a mixture of an acidic amino acid salt and a basic amino acid salt chosen from salts of arginine and glutamic acid, lysine and glutamic acid, or lysine and aspartic acid. Restraint of phospholipid coloration upon heating also results from the addition of sodium glutaminate, sodium succinate, or succinic acid to the fat. In addition, acetic anhydride or alkali metal acetate can be employed. Carbon dioxide-generating compounds also inhibit thermal darkening of fats containing phospholipids. Japan Pat. No. 107,530 of Matsueda et al., issued Aug. 23, 1979, discloses the use of a carbon dioxide-generating compound comprising the carbonates of potassium, ammonia, and magnesium, and bicarbonates of ammonia and sodium, added to the fat and lecithin mixture at a minimum level of 5% by weight, preferably 20% by weight, of the phospholipid. It is suggested that the carbon dioxide gas generated by heating for ten minutes at 150° C. (302° F.) or higher contributes to decreased discoloration. Japan Pat. No. 110,210 of Matsueda et al., issued Aug. 29, 1979, discloses a barbecue oil composition containing vegetable oil, a phosphatide, and a compound that generates carbon dioxide upon heating. The latter inhibits spattering and coloration upon heating of the barbecue composition.

Pretreatment of lecithin to prevent thermal browning in heated fat compositions is taught by Japan Pat. No. 54,400, issued Apr. 21, 1980. The pretreatment comprises heating the lecithin in an inert atmosphere, either alone or diluted with a fat, at 150° C. to 230° C. (302° F. to 446° F.) for five minutes to one hour.

The fact that weak bases inhibit thermal darkening of fats containing lecithin suggests that a strong base would be ineffective. Commercial lecithin usually contains carbohydrate substances such as short chain polysaccharides and oligosaccharides. These substances are also contained in many foods. Treatment of lecithin with a strong base in the presence of saccharides would be expected to increase darkening due to isomerization of the saccharide and even decomposition of the chain. It is unexpected that treatment of lecithin with a strong base would decrease darkening when used in cooking fats.

It has now been found that fat compositions containing lecithin and a strongly basic compound resist excessive thermal darkening. Treatment of the fat or lecithin with a strongly basic compound stabilizes the lecithin and prevents excessive discoloration of fats containing lecithin when heated. Strong bases such as sodium hydroxide, magnesium hydroxide, potassium hydroxide, and the like, are most effective. Thus, it is probably not the generation of carbon dioxide gas during heating that contributes to decreased discoloration of fats containing phospholipids, but instead the basic properties of the additive employed. The use of a low level of a strong base is advantageous in that the storage stability and the taste of the fat are not adversely affected. The preferred high levels of carbon dioxide generating compounds of Matsueda et al. would not be expected to contribute to enhanced storage stability or taste.

Accordingly, it is an object of this invention to provide novel fat compositions which resist thermal darkening.

It is a further object of this invention to provide novel processes for stabilizing lecithin to prevent excessive darkening of fats containing lecithin upon heating.

It is a further object of this invention to provide a process for the pretreatment of lecithin that will aid in decreasing its thermal discoloration in heated fats.

These and other objects of the invention will be evident from the following disclosure. All percentages are by weight unless otherwise indicated.

DISCLOSURE OF THE INVENTION

A new and improved fat composition which is resistant to thermal darkening when heated has been discovered comprising a major amount of an edible fluid fat, lecithin in an amount of at least about 0.05% by weight of the fat, and a strong base in an amount of at least 0.00005% by weight of the fat.

The fat comprises primarily triglycerides having saturated or unsaturated $C_{12}$ to $C_{22}$ fatty acid moieties, preferably containing a suspension of particulate triglyceride hardstock. Preferably, the lecithin is present in an amount of from about 0.1% to about 1% by weight of the fat, and the base is present in an amount of at least about 0.1% by weight of the lecithin. Most preferably, the lecithin is present in an amount of from about 0.3% to about 0.6% by weight of the fat, and the base is present in an amount of from about 0.5% to about 3% by weight of the lecithin. The strong base preferably comprises sodium hydroxide, magnesium hydroxide, or potassium hydroxide.

Additionally, this invention comprises methods for stabilizing lecithin to prevent excessive thermal darkening of a cooking fat containing lecithin when the fat is heated for an extended time period. More specifically, addition of a basic solution of sodium hydroxide, magnesium hydroxide, potassium hydroxide, or other strong base to the lecithin or to the fat, retards darkening of the lecithin when used as an anti-sticking agent in cooking fats. The strong base can be added directly to the cooking fat either prior to or after the addition of the lecithin component. No pretreatment of the lecithin is required in this method. Alternatively, in a pretreatment stabilization process for lecithin, the base can be added to the lecithin alone or mixed with a small amount of fat, and then added to the cooking fat. In a third alternative, the base can be added to the lecithin alone or mixed with a small amount of fat, filtered, and added to the cooking fat. A final fourth alternative comprises addition of the base to the lecithin, optional neutralization of the resulting solution, extraction of the lecithin with a nonpolar solvent, and addition of the lecithin to a fat. Each of these methods will retard thermal darkening of the fat in use. The lecithin can therefore be added to the fat at a higher level to improve anti-sticking performance. This invention is especially useful for improving the anti-sticking performance of grilling fats.

DESCRIPTION OF PREFERRED EMBODIMENTS

The invention comprises fat compositions containing lecithin which resist thermal darkening when heated, and methods for the stabilization of lecithin to prevent excessive darkening of cooking fats containing lecithin when heated. Treatment of the lecithin or fat with a strong base retards thermal darkening of the lecithin when used as an anti-sticking agent in cooking fats.

Bases suitable for use in the compositions and processes of the present invention include sodium hydroxide, potassium hydroxide, magnesium hydroxide and other similar strong bases. The base component is preferably added as a concentrated aqueous solution. Addition of solid bases to fat compositions or lecithin results in nonuniform dissolution and dispersion which can generate uneven color development. Weaker bases such as sodium carbonate and the like can also be employed, but must be added at higher concentrations or in greater amounts compared to the stronger bases.

Fats suitable for use in the present invention include all edible fats or oils which are solid, plastic, liquid, or fluid, i.e., pourable or fluid when heated to temperatures normally encountered in cooking operations of from about 200° F. (93° C.) to about 500° F. (260° C.). The fats typically comprise triglycerides having $C_{12}$ to $C_{22}$ fatty acid moieties. These materials can be derived from plants or animals or can be edible synthetic fats or oils. Animal fats such as lard, tallow, oleo oil, oleo stock, oleo stearin, and the like, can be used. Also, liquid oils, such as unsaturated vegetable oils, or liquid oils converted into plastic fats by partial hydrogenation of the unsaturated double bonds of the fatty acid constituents, or by proper mixture with a sufficient amount of solid triglycerides are suitable.

Preferred fats are fluid fats having a sufficiently low content of triglycerides of melting point higher than about 60° F. (16° C.), as to provide upon cooling of the composition from about 100° F. (38° C.) to about 60° F. (16° C.) an increase in the amount of solids of not more than about 20%. Such fats are fully pourable at room temperatures. Liquid glycerides useful herein comprise primarily triglycerides having $C_{12}$ to $C_{22}$ fatty acid moieties which can be saturated or unsaturated. They can be derived from any of the naturally occurring glyceride oils such as soybean oil, cottonseed oil, peanut oil, rapeseed oil, sesame seed oil, sunflower seed oil, and the like. Also suitable are liquid oil fractions obtained from palm oil, lard, and tallow, as for example by graining or directed interesterification followed by separation of the oil.

The fluid fat preferably includes triglycerides having acyl groups predominantly in the range of from 16 to 22 carbon atoms and having a polyunsaturated character. Preferred polyunsaturated triglycerides includes those derived from soybean, cottonseed, peanut, safflower, and sunflower seed. The preferred fluid fat contains a suspension of a triglyceride hardstock constituent in particulate form. The hardstock constituent usually amounts to from about 0.5% to about 15% by weight of the fat, preferably from about 2% to about 5% by weight. The hardstock constituent comprises substantially fully hydrogenated normally solid fatty triglyceride, and optionally a normally solid fatty emulsifier. The hardstock constituent ordinarily has an iodine value of less than about 15, preferably it has an iodine value ranging from about 1 to about 12. The normally solid fatty triglycerides in the hardstock constituent ordinarily contain in each of their fatty acid moieties from 12 to 22 carbon atoms. The hardstock normally has a particle size in the range from about 3 to about 100 microns to allow the fat to have a stable liquid or fluid state.

Various other additives can be used in the cooking fats of this invention consistent with the ultimate end use, which primarily comprises various types of frying or griddling. The compositions of this invention can normally contain optional amounts of flavorings, emulsifiers, anti-spattering agents, anti-foaming agents and the like. Any adverse effects on fat color due to the additives can possibly be negated or compensated for by use of slightly higher levels of strong base in the treatment of the lecithin, or partial or total encapsulation of the additive.

Lecithin suitable for use in the present invention includes most commercially available lecithins, such as powdered and granular lecithin, hydroxylated lecithin, and natural lecithin. Lecithin can be derived from a variety of animal and vegetable sources. Suitable vegetable lecithins can be derived from soybean oil, ground nut oil, cottonseed oil, and corn oil. Lecithin derived from soybean oil is preferred. The term lecithin as used herein is defined as commercial lecithin, typically containing about 60% of three major phospholipids, i.e., phosphatidyl choline, phosphatidyl ethanolamine, and phosphatidyl inositide, about 11% of other phosphatides, about 5% to 7% oligosaccharides, and about 33% to 35% oil.

The amount of lecithin included in cooking fats as an anti-sticking agent is presently limited by thermal darkening at cooking temperatures. Lecithin at a level of about 0.3% or higher by weight can cause noticeable darkening of the fat when heated. Therefore, lecithin is commonly included in an amount of from about 0.1% to about 0.3% by weight. The present invention permits its inclusion at concentrations greater than 0.3% by weight, ranging up to about 1.0% by weight of the fat. Because thermal darkening is prevented or significantly retarded, lecithin can be added to the compositions of the present invention at a level of from about 0.05% to about 1.0% by weight of the fat. Preferably, the lecithin is added to the composition in an amount of from about 0.3% to about 1.0% by weight of the fat. Most preferably, the lecithin is added to the composition in an amount of from about 0.3% to about 0.6% by weight of the fat.

The base is preferably added as an aqueous solution. The amount of basic solution that must be actually added to achieve a specific concentration of base by weight of the lecithin will vary dependent upon the concentration of the basic solution. Solutions of about 5% to about 50% base by weight are preferred for use herein. For weaker bases, solutions of from about 20% by weight base to saturated solutions can be employed. Addition as a solid often results in incomplete dissolution and dispersal in the fat resulting in uneven color development. To retard fat discoloration upon heating, a minimum base concentration of at least about 0.00005% by weight of the fat is required. Preferably, for the compositions of the present invention, the base concentration comprises at least about 0.0003% by weight of the fat. Most preferbly, the base concentration comprises a minimum of about 0.0015% by weight of the fat. Table A lists various concentrations of base by weight of the fat and by weight of the lecithin for various lecithin concentrations in the fat. For weak bases, such as sodium carbonate, a minimum base concentration of at least about 0.002% by weight of the fat is needed. This corresponds to a base concentration of 0.675% by weight of the lecithin when the lecithin is present at 0.3% by weight of the fat. The preferred concentration range is from about 0.004% to about 0.008% by weight of the fat. These correspond to base concentrations by weight of the lecithin of 1.35% and 2.7% when the lecithin is present at 0.3% by weight of the fat. For levels other than 0.3% lecithin by weight of the fat, a table similar to Table A can be computed by calculating ratios.

TABLE A

| Base as % of Lecithin | Base as % of Fat |
|---|---|
| 0.05% Lecithin in Fat | |
| 0.1 | 0.00005 |
| 0.5 | 0.00025 |
| 1.0 | 0.0005 |
| 3.0 | 0.0015 |
| 0.3% Lecithin in Fat | |
| 0.1 | 0.0003 |
| 0.5 | 0.0015 |
| 1.0 | 0.003 |
| 3.0 | 0.009 |
| 0.6% Lecithin in Fat | |
| 1.0 | 0.0006 |
| 0.5 | 0.003 |
| 1.0 | 0.006 |
| 3.0 | 0.018 |
| 1% Lecithin in Fat | |
| 0.1 | 0.001 |
| 0.5 | 0.005 |
| 1.0 | 0.01 |
| 3.0 | 0.03 |

Any of several stabilization techniques for treatment of the lecithin or fat with a strong base can be employed. Each method is effective to prevent excessive thermal browning of the fat in use, thereby permitting higher lecithin levels for improved antisticking performance of the fat.

One method to retard thermal darkening of cooking fats containing lecithin by base stabilization of the lecithin is to add the base directly to the cooking fat either prior to or after addition of the lecithin. This treatment significantly decreases thermal darkening of the fat when used in cooking. It has the additional advantage of simple execution by either the cooking fat manufacturer or the fat user. No pretreatment of the lecithin is required.

In a pretreatment stabilization process for the lecithin, a strong base is added to lecithin optionally mixed with a small amount of fat, heated and mixed, and added to the cooking fat. Discoloration of the fat in use is decreased. The concentration of the base relative to the concentration of lecithin desired in the fat is important in selecting the method most appropriate.

In a third alternative, the base can be added to lecithin optionally mixed with a small amount of fat, heated and filtered, and mixed with the cooking fat. Filtration of the lecithin in combination with the base treatment reduces color development more than the base treatment alone. Much of the lecithin is removed by the filtration, thereby additionally reducing color development. Fractionation of lecithin and testing of the following phosphatide components: (1) cephalin, (2) choline, (3) inositide, and also testing of lecithin with only saccharides removed, has shown that both cephalin and the oligosaccharides contrigute to thermal discoloration.

A final pretreatment stabilization process for the lecithin comprises: (1) addition of a strong base to lecithin; (2) optional neutralization of the resulting solution; (3) extraction of the lecithin with a nonpolar solvent, and (4) addition of the lecithin to a cooking fat. The neutralization is usually accomplished by addition of an acid such as phosphoric acid. Hexane, or other similar nonpolar solvents are employed for the extraction step. The extracted lecithin can be heated to aid in its dispersion in the cooking fat. An equivalent procedure is to dissolve crude lecithin in a nonpolar solvent such as hexane with the strong base, neutralize with an acid/base titration, extract the lecithin, wash it with a solvent such as acetone, and add it to the desired fat.

It can be appreciated that still other executions of this invention can be devised without departing from its scope and spirit and without losing its advantages. Minor processing steps can be added or subtracted or the sequence of some steps interchanged without departing from the scope of the invention. In particular, lecithin or fat treatment with a strong base, however practiced, results in prevention of or significant decreases in thermal darkening of fats containing lecithin. This permits use of increased amounts of lecithin in fats to enhance their anti-sticking function.

Kettle Browning Test Method

Comparison of fat composition discoloration in all compositions and lecithin stabilization processes was via a standard kettle browning test method. A kettle was filled with liquid oil at a specific level, heated, and maintained at 350° F. (177° C.). Four hundred grams of the composition to be tested were placed into each of four beakers. The beakers were placed in a rack on top of the kettle in a manner such that they were predominantly immersed in the oil contained within the kettle. A thermometer was placed in each beaker. The compositions were heated to 340° F. (171° C.). The compositions were then sampled and absorbance measured for each using a spectrophotometer. Reference compositions were tested in the same manner. Reference samples comprised the fat composition being tested with no lecithin component or with an untreated lecithin component present at the same concentration as in the test sample. Absorbance readings for each test and reference composition were obtained on a Varian Series 634 U.V.—Visible Spectrophotometer set at a wavelength of 534 nm. at periodic time intervals after continuous heating of the samples. Test samples containing solids resulted in inaccurate absorbance readings. When this occurred, samples were heated to a higher temperature to dissolve the solids, or alternatively, samples and reference compositions were filtered and reheated prior to measuring their absorbance.

The following embodiments illustrate the practice of this invention, but are not intended to limit it.

EXAMPLE 1

Example 1 illustrates a fat composition containing sodium hydroxide which resists thermal darkening, as well as the addition of a strong base to cooking fat prior to addition of lecithin to prevent excessive thermal darkening of the fat.

A 50% sodium hydroxide solution was added with stirring to a fluid vegetable shortening to prepare a shortening sample containing 30 ppm (0.003% by weight) of sodium hydroxide. The shortening comprised triglycerides having $C_{12}$ to $C_{22}$ fatty acid moieties and contained from about 0.5% to about 15% by weight of a suspension of triglyceride hardstock in particulte form. Commercial lecithin was added in an amount of 0.3% by weight of the shortening. A reference shortening sample containing no sodium hydroxide and 0.3% by weight lecithin was prepared. The reference and test samples were then subjected to the kettle browning test previously described. Samples were maintained at 340° F. (171° C.) and absorbance measured after one, two, four and six hours. Data are summarized in Table I. A lower absorbance indicates less color intensity in the base-treated sample, i.e., more light is transmitted through the sample.

TABLE I

| | Absorbance | | | |
|---|---|---|---|---|
| Sample | 1 HR | 2 HR | 4 HR | 6 HR |
| Fat + 0.3% lecithin | .284 | .338 | .380 | .390 |
| (Fat + 0.003% NaOH) + 0.3% lecithin | .050 | .070 | .100 | .120 |

EXAMPLE 2

Example 2 illustrates pretreatment of lecithin with a strong base prior to its addition to a cooking fat to reduce thermal darkening of the fat in use.

Three commercial lecithin samples were heated to 140° F. to 160° F. (60° C. to 71° C.). A 50% sodium hydroxide solution was added to the lecithin samples dropwise with stirring. Lecithin samples containing 1%, 0.5% and 0.1% by weight of sodium hydroxide were prepared. Mixtures of each base-treated lecithin sample with a fluid vegetable shortening as described in Example 1 were then prepared, such that the shortening samples each contained 0.3% by weight of the base-treated lecithin. The shortening samples thus contained 0.003%, 0.0015%, and 0.0003% by weight of sodium hydroxide.

Sodium hydroxide (50% solution) was added to each of three samples of commercial lecithin in an amount of 1% by weight of the lecithin at 100° F. (38° C.), 120° F. (49° C.) and 150° F. (66° C.) with stirring. Each base-treated lecithin sample was added at a level of 0.3% by weight to the same type of fluid vegetable shortening to prepare samples containing 0.003% by weight of sodium hydroxide.

A reference shortening sample containing 0.3% by weight of untreated lecithin was also prepared. The reference and test samples were then subjected to the kettle browning test previously described. Samples were maintained at 340° F. (171° C.) and absorbance measured after one, two, four and six hours. Data are summarized in Table II. The absorbance readings show that addition of even 0.1% NaOH by weight of the lecithin retards darkening, and the addition of 0.5% and 1.0% NaOH by weight of the lecithin is more effective. Based on this data, the minimum level of NaOH that can generate a measurable effect on color development is 0.10% NaOH by weight of the lecithin. This corresponds to 0.00005% NaOH by weight of the fat when the lecithin is present at a level of 0.05% by weight of the fat.

TABLE II

| | Absorbance | | | |
|---|---|---|---|---|
| Fat Sample | 1 HR | 2 HR | 4 HR | 6 HR |
| (a) 0.3% lecithin | .284 | .338 | .380 | .390 |
| (b) 0.3% (lecithin + 0.1% NaOH) | .210 | .290 | .340 | .340 |
| (c) 0.3% (lecithin + 0.5% NaOH) | .090 | .180 | .240 | 250 |
| (d) 0.3% (lecithin + 1.0% NaOH) | .015 | .037 | .086 | .108 |
| (e) 0.3% (lecithin + 1.0% NaOH at 100° F.) | .009 | .038 | .090 | .122 |
| (f) 0.3% (lecithin + 1.0% NaOH at 120° F.) | .010 | .039 | .091 | .113 |
| (g) 0.3% (lecithin + 1.0% NaOH at 150° F.) | .014 | .046 | .104 | .129 |

EXAMPLE 3

Example 3 illustrates a fat composition containing magnesium hydroxide which resists thermal darkening, as well as the pretreatment of lecithin with a strong base followed by filtration and addition to a cooking fat to reduce thermal discoloration of the fat.

Fifty grams of commercial lecithin was mixed with a 5% $Mg(OH)_2/H_2O$ slurry (1.85 g. $Mg(OH)_2$ and 35.15 g. water) at about 200° F. (93° C.). After cooling, samples were mixed with six times their weight of acetone at room temperature for 1 to 2 hours. After settling, the acetone was then decanted from the mixture. The same weight of fresh acetone was added to the base-treated lecithin and mixed at room temperature for about 1 to 2 hours. The resulting mixture was filtered and an off-white powdery solid obtained. The base-treated lecithin was added in an amount of 1.8 g. by weight to 1000 g. of fluid vegetable shortening as in Example 1 to prepare a fat sample containing 0.18% by weight base-treated lecithin. A reference was prepared by mixing commercial lecithin with an amount of distilled water approximately equivalent to that used in the $Mg(OH)_2$ slurry, but without $Mg(OH)_2$, at about 200° F. (93° C.). The mixture was acetone washed and filtered in the same manner as the base-treated lecithin. The water-treated lecithin was added at a level of 0.075% by weight to the same type of fluid vegetable shortening. The reference and test samples were then subjected to the kettle browning test previously described at 340° F. (171° C.) with absorbance readings after one, four, five and six hours. Data are summarized in Table III. The lower absorbance values for the fats containing base-treated lecithin at a level of over two times higher than the control demonstrate reduced thermal darkening due to the base treatment.

TABLE III

| Fat Sample | Absorbance | | | |
|---|---|---|---|---|
| | 1 HR | 4 HR | 5 HR | 6 HR |
| (a) .075% lecithin | .054 | .086 | .078 | .080 |
| (b) .18% $Mg(OH)_2$ treated lecithin | .019 | .026 | .028 | .027 |

EXAMPLE 4

Example 4 illustrates pretreatment stabilization of lecithin comprising addition of a strong base to lecithin, neutralization of the resulting solution, extraction of lecithin with a nonpolar solvent, followed by addition of the lecithin to a cooking fat.

Fifty grams of commercial lecithin were dissolved in 200 grams of hexane. One hundred grams of a 5% $Mg(OH)_2/H_2O$ slurry was added and the combination mixed for 2 hours at room temperature. Two distinct layers developed and were separated by means of a separatory funnel. One layer was primarily hexane. The other layer was an alkaline aqueous white sludge. The latter was neutralized using an acid base titration. The lecithin was extracted from the neutralized solution with hexane. After removal of the aqueous phase, the lecithin/hexane fraction was evaporated. The resulting base-treated lecithin was mixed with a fluid vegetable shortening as described in Example 1 to prepare a sample containing 0.125% by weight lecithin. A reference sample of 0.125% by weight of untreated lecithin was prepared in the fluid vegetable shortening. The reference and test samples were subjected to the kettle browning test previously described. Samples were maintained at 340° F. (171° C.) and absorbance measure after one, four, and six hours. The resulting data are summarized in Table IV. A lower absorbance indicates less color intensity of the shortening sample, i.e., more light is transmitted through the sample. Thus, in this case the sample fat with 0.125% by weight of base-treated lecithin had less discoloration than the control containing 0.125% by weight of untreated lecithin.

TABLE IV

| Fat Sample | Absorbance | | |
|---|---|---|---|
| | 1 HR | 4 HR | 6 HR |
| (a) 0.125% lecithin | .041 | .069 | .064 |
| (b) 0.125% $Mg(OH)_2$ treated lecithin | .023 | .017 | .016 |

EXAMPLE 5

Example 5 illustrates a fat composition sodium carbonate which resists thermal darkening, as well as the fact that use of a weaker base in the present invention requires a higher or more concentrated level to be effective.

A saturated solution of sodium carbonate was prepared in distilled water and added to two samples of commercial lecithin such that the lecithin contained 1.35% and 2.70% by weight of sodium carbonate. Each base-treated lecithin sample was added at a level of 0.3% by weight to the fluid vegetable shortening of Example 2. The shortening samples thus contained 0.004% and 0.008%, respectively, by weight of sodium carbonate. The samples were subjected to the kettle browning test previously described. Samples were maintained at 340° F. (171° C.) and absorbance measured after one, two, four, and six hours. Data are summarized in Table V. The absorbance readings for the fat sample containing lecithin treated with 1.35% sodium carbonate approximately corresponded to readings for the samples of Example 2 containing lecithin treated with 0.5% sodium hydroxide. Based on this data, the minimum level of sodium carbonate that can generate a measurable effect on color development is 0.675% sodium carbonate by weight of the lecithin. This corresponds to 0.002% sodium carbonate by weight of the fat. Increasing the level of sodium carbonate to 2.7% by weight of the lecithin resulted in absorbance readings lower than those obtained in Example 2 for lecithin treated with 1.0% sodium hydroxide.

TABLE V

| Fat Sample | Absorbance | | | |
|---|---|---|---|---|
| | 1 HR | 2 HR | 4 HR | 6 HR |
| (a) 0.3% (lecithin + 1.35% $Na_2CO_3$) | .05 | .12 | .21 | .23 |
| (b) 0.3% (lecithin + 2.7% $Na_2CO_3$) | .01 | .02 | .03 | .03 |

EXAMPLE 6

Example 6 illustrates that use of sodium carbonate as a solid is less effective in reducing thermal darkening of fats.

A commercial lecithin sample of 30.0 grams was heated to 110° F. (43° C.) and 0.83 grams of sodium carbonate was added with mixing. Minor flavor ingredients and a dispersant were also added and mixed. The base-treated lecithin was added to the fluid vegetable shortening of Example 2 to prepare a sample containing 0.5% by weight of lecithin. The amount of sodium carbonate was 2.8% by weight of the lecithin and 0.14% by weight of the fat.

A 22% by weight solution of sodium carbonate in distilled water was prepared and added to lecithin with mixing. The minor flavor ingredients and dispersant were added and mixed as above. The lecithin mixture was added to the fluid vegetable shortening of Example 2 at a level of 0.4% by weight. The amount of sodium carbonate was 2.8% by weight of the lecithin and 0.011% by weight of the fat.

The samples were subjected to the kettle browning test previously described. Samples were maintained at 340° F. (171° C.) and absorbance measured after one, two, three or four, and six hours. Data are summarized in Table VI.

TABLE VI

| Fat Sample | Absorbance | | | | |
|---|---|---|---|---|---|
| | 1 HR | 2 HR | 3 HR | 4 HR | 6 HR |
| (a) 0.5% (lecithin + 2.8% solid $Na_2CO_3$) | .297 | .401 | .408 | — | .414 |
| (b) 0.4% (lecithin + 2.8% $Na_2CO_3$ soln) | .016 | .034 | — | .067 | .079 |

EXAMPLE 7

Example 7 illustrates reduced thermal darkening of fats containing lecithin in amounts of 0.6, and 0.8% by weight of the fat.

A 22% by weight solution of sodium carbonate in distilled water was prepared and added with mixing to three samples of lecithin in fat. 1.814 g. of the sodium carbonate solution was added with mixing and heating to 150° F. (66° C.) to each of the following: (a) 15.6 g.

lecithin in 123.5 g. fat, and (b) 20.8 g. lecithin in 123.5 g. fat. For a reference 1.814 g. of distilled water was added to 118.7 fat plus 20.0 g. lecithin. After filtering while hot, each lecithin mixture was added to the fluid vegetable shortening of Example 2 at the following levels by weight: (a) 0.6%, (b) 0.8%, Reference 0.8%. The amount of sodium carbonate was (a) 2.6%, and (b) 1.9% by weight of the lecithin, and (a) 0.015% and (b) 0.015% by weight of the fat.

The samples were subjected to the kettle browning test previously described. Samples were maintained at 340° F. (171° C.) and absorbance measure after two and four hours. Data are summarized in Table VII.

TABLE VII

| Fat Sample | Absorbance | |
|---|---|---|
| | 2 HR | 4 HR |
| (a) 0.6% (lecithin + 2.6% $Na_2CO_3$) | .073 | .064 |
| (b) 0.8% (lecithin + 1.9% $Na_2CO_3$) | .080 | .072 |
| (c) 0.8% lecithin | .701 | .660 |

What is claimed is:

1. A process for retarding thermal darkening of fats containing lecithin comprising:
   (a) adding at least 0.00005% by weight of a strong base selected from the group consisting of sodium hydroxide, magnesium hydroxide, and potassium hydroxide to a fat containing lecithin; and
   (b) heating the mixture to at least about 200° F. (93° C.); such that thermal darkening of the fat during heating is retarded.
2. The process of claim 1 wherein the base is added to the fat prior to addition of the lecithin.
3. The process of claim 1 wherein the lecithin comprises soybean lecithin.
4. The process of claim 1 wherein the fat comprises triglycerides having saturated or unsaturated $C_{12}$ to $C_{22}$ fatty acid moieties.
5. The process of claim 4 wherein the fat contains from about 0.5% to about 15% by weight of a suspension of triglyceride hardstock constituent in particulate form.
6. The process of claim 1 wherein the base is added to the fat at a level of at least about 0.0003% by weight of the fat.
7. The process of claim 1 wherein the base is added to the fat at a level of at least about 0.0015% by weight of the fat.
8. The process of claim 1 wherein the lecithin is added to the fat at a level of from about 0.05% to about 1.0% by weight of the fat.
9. The process of claim 1 wherein the lecithin is added to the fat at a level of from about 0.3% to about 0.6% by weight of the fat.
10. A fat prepared according to claim 1.
11. A process for retarding thermal darkening of fats containing lecithin comprising:
   (a) preparing an aqueous solution of sodium carbonate;
   (b) adding the sodium carbonate solution to a fat containing lecithin in an amount such that the concentration of sodium carbonate is from about 0.675% to about 2.7% by weight of the lecithin;
   (c) heating the mixture to at least about 200° F. (93° C.); such that thermal darkening of the fat during heating is retarded.
12. A process for retarding thermal darkening of fats containing lecithin by pretreatment of the lecithin comprising:
   (a) adding a strong base selected from the group consisting of sodium hydroxide, magnesium hydroxide, and potassium hydroxide in an amount of at least 0.00005% by weight of the final fat composition to lecithin or lecithin mixed with a small amount of fluid fat;
   (b) adding the resulting mixture of step (a) to a fat; and
   (c) heating the mixture to about 200° F. (93° C.); such that thermal darkening of the fat during heating is retarded.
13. The process of claim 12 comprising the additional step of filtering the mixture of step (a) prior to step (b).
14. A fat prepared according to claim 12.
15. A fat prepared according to claim 13.
16. The process of claim 12 wherein the lecithin comprises soybean lecithin.
17. The process of claim 12 wherein the fat comprises triglycerides having saturated or unsaturated $C_{12}$ to $C_{22}$ fatty acid moieties.
18. The process of claim 17 wherein the fat contains from about 0.5% to about 15% by weight of a suspension of triglyceride hardstock constituent in particulate form.
19. The process of claim 12 wherein the base is added at a level of at least about 0.0003% by weight of the fat.
20. The process of claim 12 wherein the base is added at a level of at least about 0.0015% by weight of the fat.
21. The process of claim 12 wherein the lecithin is added to a fat at a level of from about 0.05% to about 1.0% by weight of the fat.
22. The process of claim 12 wherein the lecithin is added to the fat at a level of from about 0.3% to about 0.6% by weight of the fat.
23. A process for retarding thermal darkening of fats containing lecithin comprising:
   (a) preparing an aqueous solution of sodium carbonate;
   (b) adding the sodium carbonate solution to lecithin or lecithin mixed with a small amount of fluid fat in an amount such that the concentration of sodium carbonate is from about 0.675% to about 2.7% by weight of the lecithin;
   (c) adding the resulting mixture to a fat; and
   (d) heating the mixture to at least about 200° F. (93° C.); such that thermal darkening of the fat during heating is retarded.
24. A fat composition comprising:
   (a) a major amount of an edible fat;
   (b) lecithin in an amount of at least about 0.05% by weight of the fat; and
   (c) a strong base selected from the group consisting of sodium hydroxide, magnesium hydroxide, and potassium hydroxide in an amount of at least 0.00005% by weight of the fat effective to reduce thermal discoloration of the fat composition upon heating.
25. The composition of claim 24 wherein the lecithin comprises soybean lecithin.
26. The composition of claim 24 wherein the fat comprises triglycerides having saturated or unsaturated $C_{12}$ to $C_{22}$ fatty acid moieties.
27. The composition of claim 26 wherein the fat contains from about 0.5% to about 15% by weight of a suspension of triglyceride hardstock constituent in particulate form.

28. The composition of claim 24 wherein the base is at a level of at least about 0.0003% by weight of the fat.

29. The composition of claim 24 wherein the base is at a level of at least about 0.0015% by weight of the fat.

30. The composition of claim 24 wherein the lecithin is added to a fat at a level of from about 0.3% to abour 1.0% by weight of the fat.

31. A fat composition comprising:

(a) a major amount of an edible fluid fat;

(b) lecithin in an amount of at least 0.05% by weight of the fat; and (c) sodium carbonate at a level of from about 0.675% to about 2.7% by weight of the lecithin effective to reduce thermal discoloration of the fat composition upon heating.

* * * * *